(12) United States Patent
Kim

(10) Patent No.: US 8,235,707 B2
(45) Date of Patent: Aug. 7, 2012

(54) MULTI-BOILER AND CONTROL METHOD THEREOF FOR PREVENTING BACK FLOW OF EXHAUST GAS

(75) Inventor: Si-Hwan Kim, Incheon (KR)

(73) Assignee: Kyungdong Networks Co., Ltd., Seoul (KR)

( * ) Notice: Subject to any disclaimer, the term of this patent is extended or adjusted under 35 U.S.C. 154(b) by 456 days.

(21) Appl. No.: 12/519,154

(22) PCT Filed: Dec. 26, 2008

(86) PCT No.: PCT/KR2008/007707
§ 371 (c)(1),
(2), (4) Date: Jun. 12, 2009

(87) PCT Pub. No.: WO2009/142377
PCT Pub. Date: Nov. 26, 2009

(65) Prior Publication Data
US 2010/0330512 A1    Dec. 30, 2010

(30) Foreign Application Priority Data
May 20, 2008   (KR) .................. 10-2008-0046705

(51) Int. Cl.
*F23N 1/02* (2006.01)
*F24H 9/20* (2006.01)
*F24B 1/189* (2006.01)
*F24D 9/00* (2006.01)
(52) U.S. Cl. ............. 431/12; 236/11; 126/521; 126/101
(58) Field of Classification Search ............ 431/12; 236/11; 126/521, 101
See application file for complete search history.

(56) References Cited

FOREIGN PATENT DOCUMENTS

| | | |
|---|---|---|
| JP | 08-121749 | 5/1996 |
| JP | 10-082519 | 3/1998 |
| JP | 2001-132940 | 5/2001 |
| JP | 2002-013701 | 1/2002 |
| RU | 2084758 C1 | 7/1997 |
| RU | 2246660 C1 | 2/2005 |
| RU | 2258182 C2 | 8/2005 |

OTHER PUBLICATIONS

International Search Report of International Application No. PCT/KR2008/007707 mailed Aug. 10, 2009.
English abstract of Publication No. JP 2001-132940.
English abstract of Publication No. JP 2002-013701.

(Continued)

*Primary Examiner* — Kenneth Rinehart
*Assistant Examiner* — William Corboy
(74) *Attorney, Agent, or Firm* — Hershkovitz & Associates LLC

(57) ABSTRACT

The present invention relates to a control method of preventing backflow of exhaust gas into combustion chambers of boilers or water heaters that are not in operation for a multi-boiler comprising a plurality of boilers or water heaters connected in line, each of which including a wind pressure sensor measuring wind pressure of air flowing into a combustion chamber and a controller controlling a fan supplying air into the combustion chamber on the basis of the wind pressure measured by the wind pressure sensor. The control method includes measuring wind pressures using the wind pressure sensors in the operating boilers and calculating an average wind pressure, using any controller as a master controller to determine a control amount of wind of the fans of non-operational boilers based on the average wind pressure, and operating the fans of the non-operational boilers on the basis of the control amount of wind.

6 Claims, 3 Drawing Sheets

OTHER PUBLICATIONS

English abstract of Publication No. JP 10-082519.
English abstract of Publication No. JP 08-121749.
English Abstract for Publication No. RU 2258182 C2.
English Abstract for Publication No. RU 2246660 C1.
English Abstract for Publication No. RU 2084758 C1.

Fig. 1 - PRIOR ART
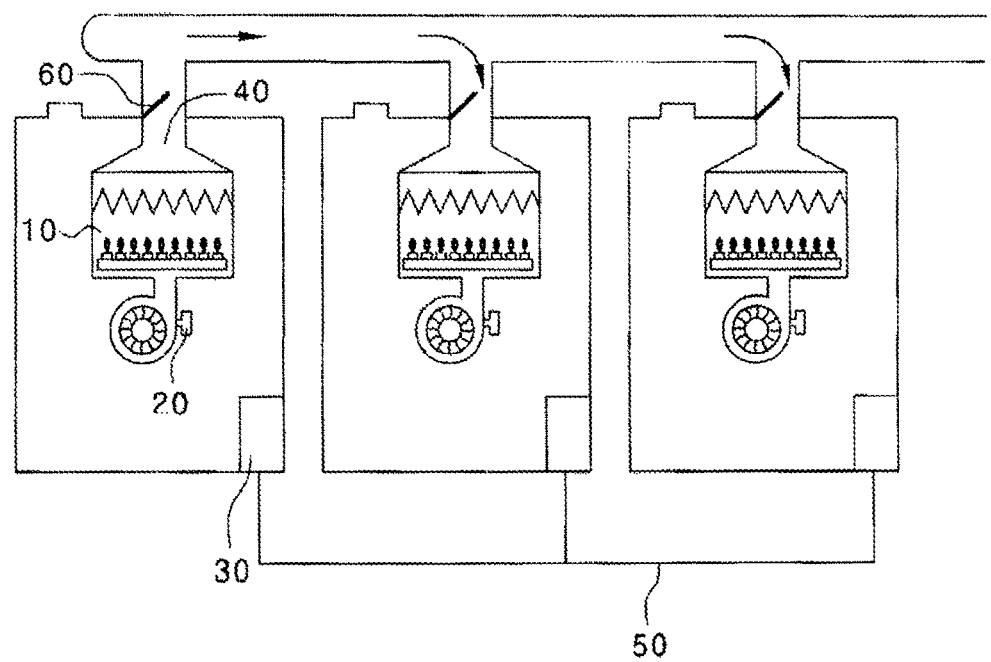
Fig. 2 - PRIOR ART
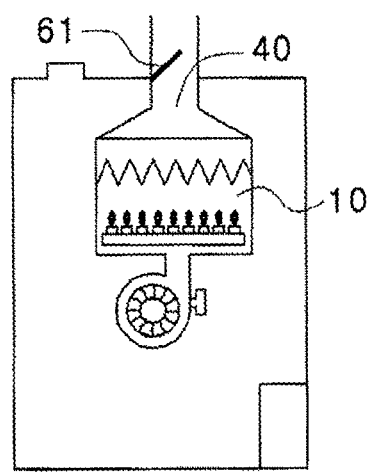

Fig. 3 - PRIOR ART
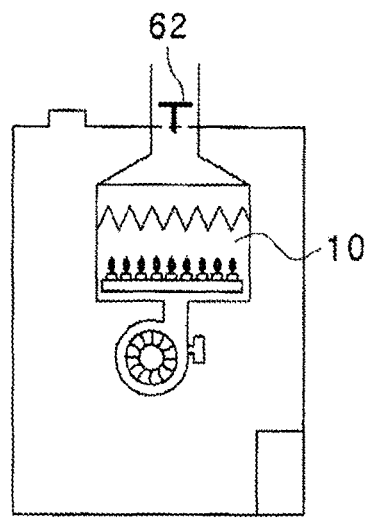
Fig. 4
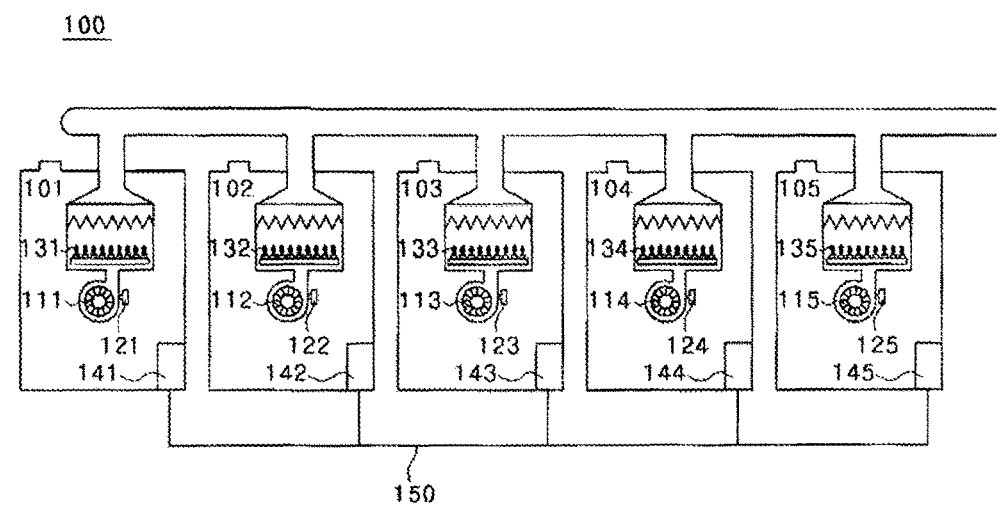

MULTI-BOILER AND CONTROL METHOD THEREOF FOR PREVENTING BACK FLOW OF EXHAUST GAS

CROSS-REFERENCE TO RELATED APPLICATIONS

The present application is a national stage application under 35 U.S.C. §371 of International Application No. PCT/KR2008/007707 with an international filing date of Dec. 26, 2008, and claims priority of KR 10-2008-0046705 filed May 20, 2008.

BACKGROUND OF THE INVENTION

1. Field of the Invention

The present invention relates to a multiboiler or a multi-water heater (hereinafter "multiboiler") for preventing exhaust gas backflow and a method of controlling the same, and more particularly, to a multiboiler that prevents exhaust gas backflow using a wind pressure sensor and a controller which are provided for each boiler without having a damper, and a method of controlling the multiboiler.

2. Description of the Related Art

In general, combustion apparatuses such as a boiler or a water heater are designed to correspond to each desired capacity. However, there is a method of arranging and using a plurality of low-capacity boilers or water heaters in a line to correspond to a desired capacity. For example, a boiler of 200,000 kilocalories per hour (kcal/h) is achieved by arranging five boilers in a line, each of which having a capacity of 40,000 kcal/h. The boilers or water heaters arranged as described above are called a multiboiler or a multi-water heater.

The multiboiler can be installed in a small space and its maintenance and management are convenient, and even if one boiler breaks down, it is possible to significantly reduce inconvenience of use by controlling other boilers that have not broken down. Further, the multiboiler is advantageous in terms of energy saving because it is possible to individually operate several boilers, depending on the desired capacity.

FIG. 1 is a schematic view of a multiboiler in the related art.

Boilers constituting a multiboiler are each provided with a wind pressure sensor 20 that measures the wind pressure of air flowing into a combustion chamber 10 and a controller 30 that controls the number of revolutions of a fan that supplies the air into the combustion chamber according to the measured wind pressure. In addition to this function, the controller 30 performs a function of controlling various parts for operating the boiler. The controllers 30 provided in the boilers are connected with each other by a communication line 50.

In this multiboiler, mainly, only some of the boilers are operated to correspond to desired heating capacities, and exhaust gas of the boilers that are in operation frequently backflows into the combustion chambers of other boilers that are not in operation. For example, when the leftmost boiler in the figure is in operation and the other boilers are not in operation, the exhaust gas discharged from the leftmost boiler may flow into the combustion chambers of the other boilers, as shown by the arrows.

When the non-operating boilers with the exhaust gas in the combustion chambers are operated, oxygen is not sufficiently supplied by the exhaust gas therein, which may cause a non-ignition or an explosive ignition. To prevent backflow of the exhaust gas, a damper 60 is generally disposed at the exhaust port 40 for each boiler, such that gas is discharged only in one direction and cannot flow inside the combustion chamber in the opposite direction.

FIGS. 2 and 3 are schematic views of examples of dampers disposed in the multiboiler in the related art. A damper 61 shown in FIG. 2 is fixed by a hinge, such that the exhaust port 40 is opened toward the exhaust pipe by the pressure of the exhaust gas discharged out of the combustion chamber 10, but does not open to the combustion chamber 10. Further, as for a damper 62 shown in FIG. 3, the exhaust port 40 is opened and the exhaust gas can be discharged toward the exhaust pipe while the damper 62 is lifted by the pressure of the exhaust gas discharged out of the chamber 10, and the exhaust port 40 is closed after discharging is finished.

However, as the dampers 61, 62 are mechanically operated, their performance deteriorates when they are used over a long period of time, and as a result, there is a problem in that they will not perform their function as dampers. Accordingly, critical damage may be caused by backflow of exhaust gas when the dampers are not operating normally.

SUMMARY OF THE INVENTION

Accordingly, designed in consideration of the above problems, an object of the present invention is to provide a multiboiler that can prevent backflow of exhaust gas using a wind pressure sensor and a controller provided for each boiler without using individual mechanical dampers.

A control method of preventing backflow of exhaust gas of a multiboiler that comprises a plurality of boilers connected in line, each of which including a wind pressure sensor measuring wind pressure of air flowing into a combustion chamber, and a controller controlling the number of revolutions of a fan supplying air into the combustion chamber on the basis of the wind pressure measured by the wind pressure sensor, in which any one of the controllers is set as a master controller and the other controllers are set as slave controllers and the master controller and the slave controllers are connected by a communication line to communicate with each other, the control method including: measuring wind pressure of air flowing into the combustion chambers using the wind pressure sensors in the controllers of boilers that are in operation; calculating the average wind pressure in the boilers that are in operation in response to information about the wind pressure measured by the controllers of the boilers that are in operation; using the master controller, determining the control amount of wind of the fans of boilers that are not in operation on the basis of the average wind pressure; and then operating the fans of the boilers that are not in operation on the basis of the determined results.

Further, the wind pressure according to the operation of the fans of the boilers that are not in operation is in a range of one-third to two-thirds of the average wind pressure.

Further, the wind pressure according to the operation of the fans of the boilers that are not in operation is one-half of the average wind pressure.

A control method of preventing backflow of exhaust gas of a multiboiler that comprises a plurality of boilers arranged in line, each of which including a sensor measuring the revolutions per minute (RPMP) of fans, and a controller controlling the RPM of fans on the basis of the RPM measured by sensors, in which any one of the controllers is set as a master controller and the other controllers are set as slave controllers and the master controller and the slave controllers are connected by a communication line to communicate with each other, the control method including: measuring the RPM of the fans in the controllers of boilers that are in operation;

calculating the average RPM of the fans of the boilers that are in operation in response to information about the RPM of the fans measured by the controller of the boilers that are in operation; using the master controller, determining the RPM of the fans that are not in operation on the basis of the average RPM; and operating the fans of the boilers that are not in operation on the basis of the determined results.

Further, the RPM of the fans of the boiler that are not in operation is in a range of one-third to two-thirds of the average RPM.

Further, the RPM of the fans of the boilers that are not in operation is one-half of the average RPM.

A multiboiler that comprises a plurality of boilers connected in line, each of which including a wind pressure sensor measuring wind pressure of air flowing into a combustion chamber and a controller controlling the number of revolutions of a fan supplying air into the combustion chamber on the basis of the wind pressure measured by the wind pressure sensor, in which any one of the controllers is set as a master controller and the other controllers are set as slave controllers, and in which the master controller and the slave controllers are connected by a communication line to communicate with each other, the master controller calculates the average wind pressure of boilers that are in operation in response to information about the wind pressure measured by the controllers of the boilers that are in operation, determines the control amount of wind of the fans of boilers that are not in operation on the basis of the average wind pressure, and then operates the fans of the boilers that are not in operation on the basis of the determined results.

Further, the wind pressure according to the operation of the fans of the boilers that are not in operation is in a range of one-third to two third of the average wind pressure measured by the wind pressure sensors.

Further, the wind pressure according to the operation of the fans of the boilers that are not in operation is one-half of the average wind pressure measured by the wind pressure sensors.

A multiboiler that comprises a plurality of boilers arranged in line, each of which including a sensor measuring the RPM of fans and a controller controlling RPM of fans on the basis of the RPM measured by sensors, in which any one of the controllers is set as a master controller and the other controllers are set as slave controllers, and in which the master controller and the slave controllers are connected by a communication line to communicate with each other, the master controller calculates the average RPM of the fans of boilers that are in operation in response to information about the RPM measured by the controllers of the boilers that are in operation, determines the RPM of the fans of boilers that are not in operation on the basis of the average RPM, and then operates the fans of the boilers that are not in operation on the basis of the determined results.

Further, the RPM of the fans of the boilers that are not in operation is in a range of one-third to two-thirds of the average RPM.

Further, the RPM of the fans of the boilers that are not in operation is one-half of the average RPM.

According to the present invention, by rotating the fans of the non-operating boilers on the basis of the present wind pressure measured by wind pressure sensors of boilers that are in operation, providing individual dampers to prevent backflow of exhaust gas and additional cost for installing the dampers are not needed, and there is little possibility of breakdown due to use over a long period of time, thereby saving the cost of maintenance.

BRIEF DESCRIPTION OF THE DRAWINGS

FIG. 1 is a schematic view of a multiboiler in the related art;

FIGS. 2 and 3 are schematic views illustrating the configurations of dampers disposed in the multiboiler in the related art;

FIG. 4 is a schematic view of a multiboiler of the present invention; and

DESCRIPTION OF THE PREFERRED EMBODIMENTS

Figure 5:
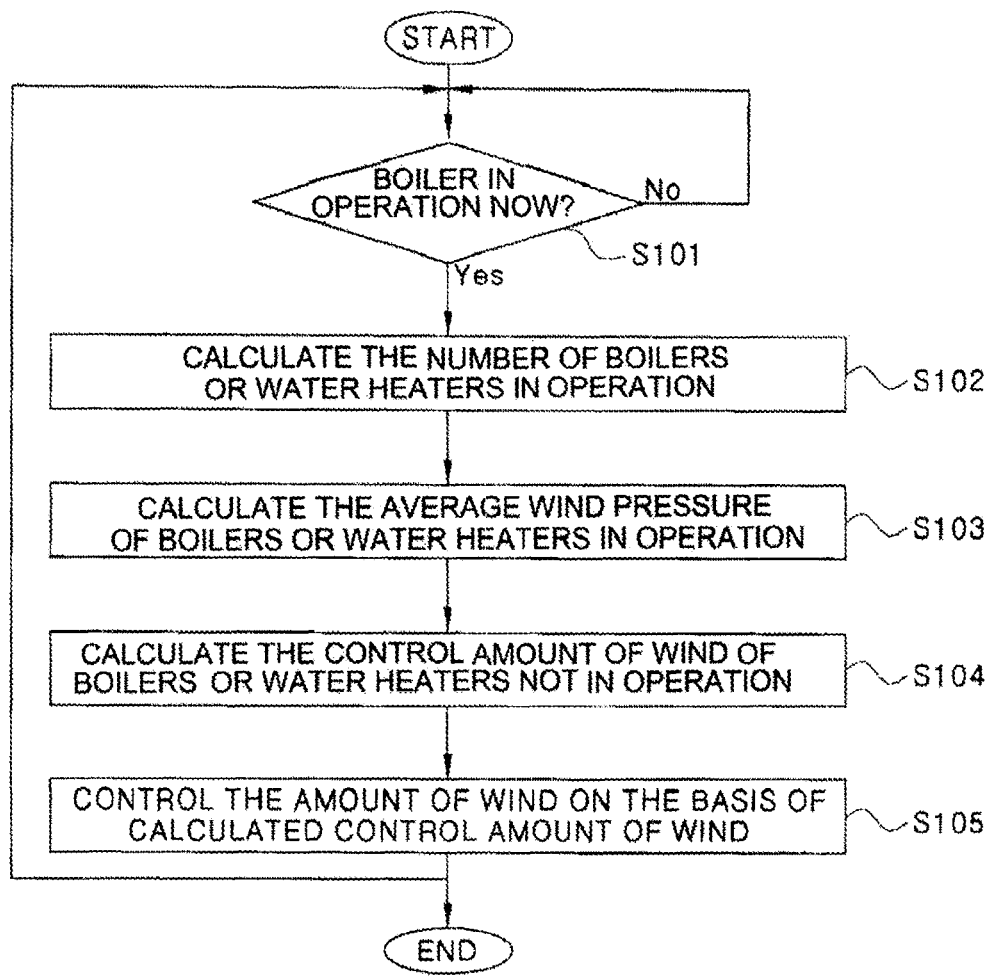
FIG. 5 is a flowchart illustrating a control method of the present invention for preventing backflow of exhaust gas.

The configuration and operation of preferred embodiments of the present invention are described hereafter in detail with reference to the accompanying drawings. Giving reference numerals to components in the drawings herein, it is noted that the same components are designated by substantially the same reference numerals, even though they are shown in different drawings.

FIG. 4 is a schematic view showing a multiboiler 100 according to an embodiment of the present invention, which is comprised of, for example, five boilers or water heaters (hereinafter "boiler") connected in a line.

Boilers 101, 102, 103, 104, 105 constituting the multiboiler 100 according to an embodiment of the present invention respectively include: fans 111, 112, 113, 114, 115 that send air into combustion chambers; wind pressure sensors 121, 122, 123, 124, 125 that measure the pressure of air flowing into the combustion chambers; burners 131, 132, 133, 134, 135; and controllers 141, 142, 143, 144, 145 that control the numbers of revolutions of the fans which supply air into the combustion chambers on the basis of the wind pressures measured by the wind pressure sensors. The controllers 141, 142, 143, 144, 145 are connected with each other by a communication line 150 to communicate with each other. In general, one of the controllers provided in the boilers is set as a master controller and the others are correspondingly set as slave controllers. For example, assuming that the rightmost controller 145 is set as a master controller, the other four controllers 141, 142, 143, 144 are set as slave controllers. For simplicity, a more detailed description of other components of the boilers is not provided.

A control method of preventing backflow according to an embodiment of the present invention can be used for forced exhaust type boilers that forcibly discharge gas using fans 111, 112, 113, 114, 115, as shown in FIG. 4. In the control method according to an embodiment of the present invention used for forced exhaust type boilers, since air supply lines of the forced exhaust type boilers are open to the atmosphere, new air can be easily supplied even if exhaust gas backflows into the combustion chambers, such that an adverse effect due to the backflow is not large.

The control method of preventing backflow of exhaust gas of the multiboiler 100 according to an embodiment of the present invention is performed by measuring wind pressures of boilers which are in operation using the wind pressure sensors 121, 122, 123, 124, 125 disposed in the existing boilers 101, 102, 103, 104, 105 without specifically installing dampers, and calculating an average pressure of the boilers which are in operation. The main controller, in response to information of the wind pressures, calculates the control amount of wind of the fans to produce a wind pressure about one-third to two-thirds of the average wind pressure, and then gives an order to rotate the fans of the boilers that are not in operation. It is preferable to rotate the fans of the non-operating boilers to produce a wind pressure about one-half of the average pressure of the boilers that are in operation.

As described above, since the fans of the non-operating boilers rotate to produce a predetermined amount of wind, the exhaust gas from the boilers which are in operation does not backflow into the chambers of the non-operating boilers, and even if the exhaust gas has backflowed into the combustion chambers of the non-operating boilers, it can be discharged outside by the fans of the non-operating boilers.

FIG. 5 is a flowchart illustrating the control method of preventing backflow of exhaust gas according to an embodiment of the present invention, in which it is assumed that the controller 145 of the rightmost boiler 105 is set as a master controller.

First, the master controller 145 determines whether some of the boilers 101, 102, 103, 104, 105 of the multiboiler 100 are in operation (S101).

For example, when the two leftmost boilers 101, 102 are in operation, the total number of boilers 101, 102 that are in operation is calculated (S102). The number is two in this example.

The master controller 145 receives information about the wind pressures measured by the wind pressure sensors 121, 122 of the boilers 101, 102 that are in operation, and calculates the average wind pressure of the boilers that are in operation by dividing the entire wind pressure by the number of the boilers 101, 102 that are in operation (S103).

The master controller 145 calculates the control amount of wind of the fans 113, 114, 115 of the boilers 103, 104, 105 that are not in operation on the basis of the average wind pressure of the boilers 101, 102 that are in operation (S104). The control amount of wind of the fans is calculated to produce a wind pressure between one-third to two-thirds of the average wind pressure of the boilers 101, 102 that are in operation, and the numbers of revolutions of the fans 113, 114, 115 are correspondingly calculated. It is preferable to calculate the control amount of wind of the fans 113, 114, 115 to produce one-half of the average wind pressure of the boilers 101, 102 that are in operation. For example, when the average wind pressure of the boilers 101, 102 that are in operation is 70% of the maximum wind pressure that the fans can produce, the control amount of wind of the fans 113, 114, 115 of the boilers 103, 104, 105 that are not in operation is calculated to be 35% of the maximum wind pressure.

Next, the master controller 145 controls the amount of wind of the fans 113, 114, 115 that are not in operation, that is, the number of revolutions of the fans, on the basis of the calculated control amount of wind (S105).

Another embodiment of the present invention is implemented by measuring the RPM of fans instead of the wind pressures of the fans of boilers that are in operation using sensors, calculating the average RPM of the fans of the boilers that are in operation on the basis of the measured results using a master controller, which then calculates the control RPM of the fans at one-third to two-thirds, preferably one-half, of the average RPM, and gives an order of rotating the fans of the boilers that are not in operation on the basis of the calculated result. The configuration of a multiboiler including the sensors measuring the RPM of the fans and the controller is the same as the configuration of the multiboiler shown in FIG. 4, that is, a configuration for controlling the RPM using the controller and the sensors measuring the RPM is included instead of the wind pressure sensors 121, 122, 123, 124, 125 in the multiboiler 100 shown in FIG. 4. Further, a control method according to the above configuration is the same as the flowchart of FIG. 5, but using measurement of the RPM of the fans instead of the wind pressures of the fans of the boilers that are in operation and control the RPM of the fans of the boilers that are not in operation. The configuration of the sensor measuring the RPM of the fans and the control of the RPM by the controller are well known in the art, such that a more detailed description is not provided.

According to the control method of preventing backflow of exhaust gas according to an embodiment of the present invention, it is possible to effectively prevent exhaust gas of the boilers that are in operation from flowing into the combustion chambers of the boilers that are not in operation by using the control method that uses the wind pressure sensors and controllers individually disposed in the boilers constituting the existing multiboiler, without installing specific dampers. Further, the control is possible by only measuring the RPM of the fans of the boilers that are in operation and controlling the RPM of the fans of the boilers that are not in operation, on the basis of the measured RPM. Therefore, cost for installing dampers is saved, and there is little possibility of breakdown of the multiboiler because dampers are not used in the present invention.

Meanwhile, power consumption for rotating the fans of the boilers that are not in operation to prevent backflow of exhaust gas is not large, which has little influence on the cost for maintenance of all the boilers.

The present invention is not limited to the above embodiments, and it is apparent to those skilled in the art that the present invention can be modified and changed in various ways, without departing from the technical sprit and scope of the present invention.

As described above, the present invention makes it possible to prevent exhaust gas from flowing into combustion chambers that are not in operation in a multiboiler.

What is claimed is:

1. A control method of preventing backflow of exhaust gas of a multiboiler comprising a plurality of boilers arranged in line, each of the plurality of boilers including a fan, a sensor measuring revolutions per minute (RPM) of the fan of each of the plurality of boilers and a controller controlling the RPM of the fan of each of the plurality of boilers on a basis of the RPM measured by the sensor, wherein any one of the controllers of the plurality of boilers is set as a master controller and the other controllers of the plurality of boilers are set as slave controllers, the master controller and the slave controllers being connected by a communication line to communicate with each other, the control method comprising:
    measuring the RPM of the fan of each of the plurality of boilers by the controller of each of the plurality of boilers that are in operation;
    calculating an average RPM of the fans of the plurality of boilers that are in operation based on the measured RPM by using the master controller;
    determining the RPM of the fan of each of the plurality of boilers that are not in operation on a basis of the average RPM by using the master controller; and
    operating the fan of each of the plurality of boilers that is not in operation on a basis of the determined RPM by using the master controller.

2. The control method of claim 1, wherein the RPM of the fan of each of the plurality of boilers that is not in operation is in a range of one-third to two-thirds of the average RPM.

3. The control method of claim 2, wherein the RPM of the fan of each of the plurality of boilers that is not in operation is one-half of the average RPM.

4. A multiboiler comprising a plurality of boilers arranged in line, each of the plurality of boilers including:

a fan;

a sensor configured to measure revolutions per minute (RPM) of the fan of each of the plurality of boilers;

a controller configured to control the RPM of the fan on a basis of the RPM measured by the sensor, wherein any one of the controllers of the plurality of boilers is set as a master controller and the other controllers of the plurality of boilers are set as slave controllers, the master controller and the slave controllers being connected by a communication line to communicate with each other, and wherein the master controller calculates an average RPM of the fans of the plurality of boilers that are in operation based on the RPM measured by the sensor of each of the plurality of boilers that are in operation, determines the RPM of the fan of each of the plurality of boilers that are not in operation on a basis of the average RPM, and operates the fan of each of the plurality of boilers that are not in operation on a basis of the determined RPM.

5. The multiboiler according to claim 4, wherein the RPM of the fan of each of the plurality of boilers that is not in operation is in a range of one-third to two-thirds of the average RPM.

6. The multiboiler according to claim 5, wherein the RPM of the fan of each of the plurality of boilers that is not in operation is one-half of the average RPM.

* * * * *